Jan. 25, 1966  F. B. SWANSON  3,230,563
SWIVEL OUTSIDE-INSIDE BRUSH
Filed Oct. 3, 1963  2 Sheets-Sheet 2

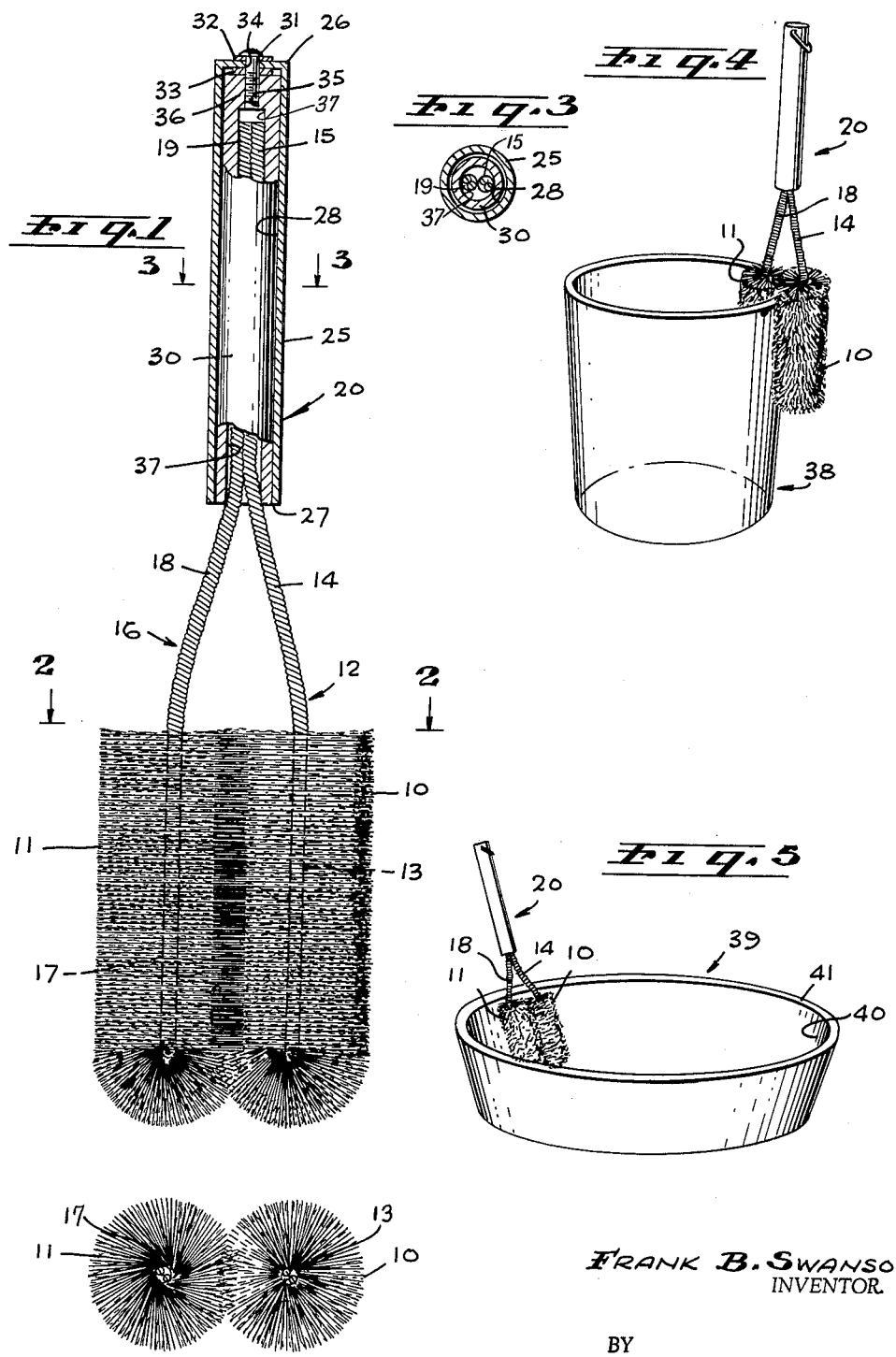

FRANK B. SWANSON
INVENTOR.

BY
Beehler & Shanahan
ATTORNEYS

United States Patent Office 3,230,563
Patented Jan. 25, 1966

3,230,563
SWIVEL OUTSIDE-INSIDE BRUSH
Frank B. Swanson, 1016 E. Colorado Blvd.,
Glendale, Calif.
Filed Oct. 3, 1963, Ser. No. 313,685
4 Claims. (Cl. 15—164)

The invention relates to scrubbing implements and has particular reference to a brush-like instrument used for cleaning dishes, pots, pans, glasses, and the like. More particularly the invention involves a manually operated scrubber readily usable in a dishpan or sink to make dishwashing easier and quicker.

Although automatic dishwashers for the home have been introduced to a substantial degree, a great deal of dishwashing, especially for a few pieces at a time, continues to be done by hand. Moreover, although many innovations have been made in kitchen utensils, there has been little change in the fabrication of brushes for bottles, pots, pans, etc., except perhaps for substituting new materials for old.

When a pan or dish is to be washed, it is invariably dirty on both inside and out, although perhaps to a different degree. The same is true of a glass, plate or other utensil used for either cooking or eating. This means that when the article is to be washed and to be certain that the article is thoroughly washed as that operation is carried on by hand, the article must be held in one hand while being swabbed on one side and then turned over and ultimately swabbed on the other side. This is an unnecessarily long time-consuming operation considering the modest amount of swabbing, brushing, or cleaning which is usually necessary. When a pan full of utensils of one kind or another are to be washed this way, an inordinately long time may be occupied in the process. The time consumed is further aggravated when a bar of soap is used which slides around in the bottom of the dishpan and must be caught and retrieved each time the dishcloth or brush needs resoaping. Extra time is needed very frequently in cleaning the corners of pots and pans where the inside corner is relatively sharp.

Among the objects of the invention, therefore, is to provide a new and improved quick, easy scrubber for simultaneously cleaning the inside and outside wall of food utensils such as dishes, pots, skillets, glasses, etc.

Another object of the invention is to provide a new and improved double acting scrubber or brush which simultaneously scrubs or brushes both the inside and outside of the utensil and which, moreover, does not need to have its handle slide about in the hand of the user nor require changing of the grip in order to reach all portions on both sides of the utensil being cleaned.

Still another object of the invention is to provide a new and improved inside-outside scrubber or brush for the cleaning of utensils which incorporates a swivel at the handle so that a handle once grasped manually can be tightly held while the brush is swirled around the walls of the utensil whereby to quickly and effectively clean both the inside and the outside surfaces without the necessity for changing the position of the utensil or changing the grip upon the scrubber.

Still another object of the invention is to provide a new and improved swivel-acting double scrubber or brush for pots, pans, dishes, glasses, and the like, which is relatively inexpensive and thorough in its operation.

Still further among the objects of the invention is to provide a new and improved swivel handle outside-inside hand scrubber which is especially effective in reaching into the inside corners and also reaching over the bottom for cleaning out both the corner and the bottom at the same time that both inside and outside walls are being cleaned.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a vertical elevational view of a twin scrubbing brush showing the handle in cross-section.

FIGURE 2 is a cross-sectional view on the line 2—2 of FIGURE 1.

FIGURE 3 is a cross-sectional view on the line 3—3 of FIGURE 1.

FIGURE 4 is a side perspective view of the device of FIGURE 1 in operation on one form of utensil.

FIGURE 5 is a side perspective view of the device of FIGURE 1 in operation on another form of utensil.

Figures 6, 7:
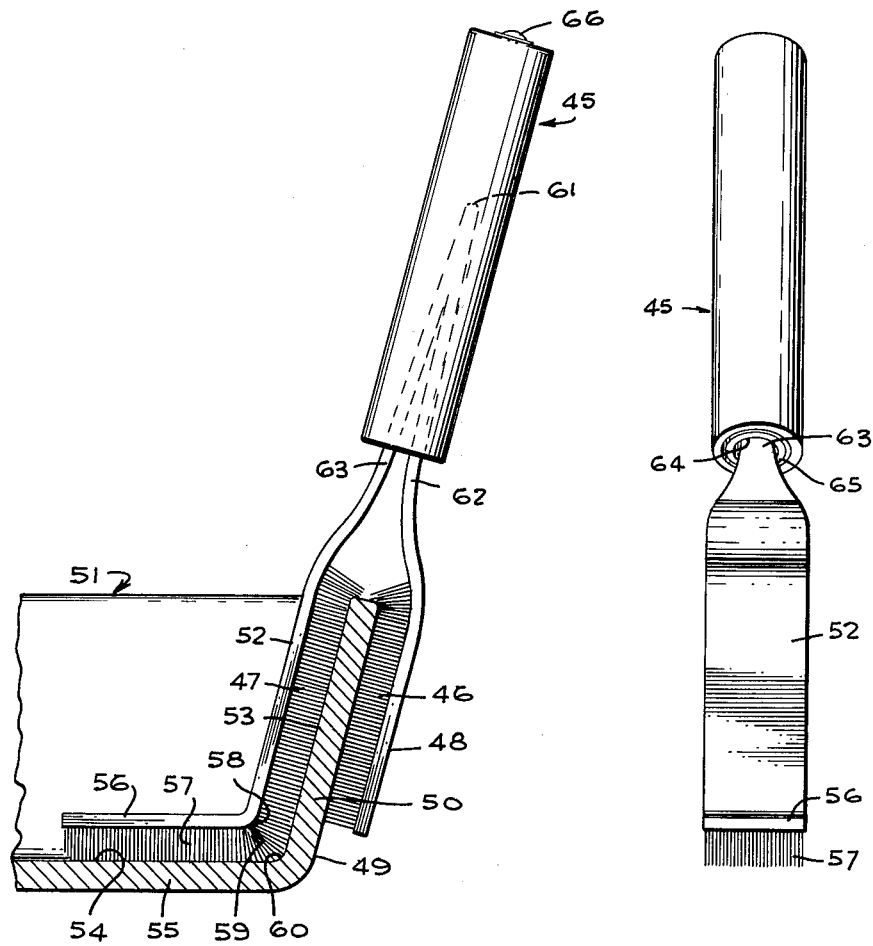
FIGURE 6 is a side elevational view of a modified form of twin scrubbing device showing the device in operation on a pan which is shown in fragmentary section.
FIGURE 7 is a side elevational view of the twin scrubber of FIGURE 6.

In an embodiment of the invention chosen for the purpose of illustration there is shown a scrubbing implement which, in the chosen embodiment, consists of twin brushes 10 and 11 located side by side and so close together that the bristles of one overlap and intermingle with the bristles of the other. Each brush is virtually a duplicate of the other and consists of a twisted wire shank 12 having a lower part 13 holding bristles forming the brush 10, an intermediate part 14 and an upper part 15. A twisted wire shank 16 for the brush 11 similarly consists of a lower part 17 for holding the bristles of the brush 11, an intermediate part 18 and an upper part 19. The lower parts 13 and 17 are parallel to each other and spaced apart, as previously indicated, a distance such that the length of the bristles cause them to overlap. The upper parts 15 and 19 are parallel to each other and in engagement with each other. Intermediate parts 14 and 18 form the transition from the contiguous upper parts to the spaced lower parts. In practice it has been found that twisted shanks can be effectively made from twin strands twisted together so as to thereby hold the bristles between them and twisted tight enough to reinforce and strengthen the shank as well as to give it a degree of resiliency.

A handle, indicated generally by the reference character 20, is built in part of an exterior tubular casing 25 having an upper closed end 26 and a lower open end 27. Being tubular, the casing 25 provides a cylindrical interior wall 28, the length of the tubular casing being about equal to the breadth of a human hand or slightly greater.

A tubular insert 30 has an exterior slightly smaller than the cylindrical interior wall 28 so that the insert can rotate freely within the tubular casing. A bolt 31 provided with washers 32 and 33 extends through a hole 34 in the upper closed end 26 and then into a threaded bore 35 in a closed upper end 36 of the tubular insert 30.

Within the tubular insert 30 is a bore 37 having a diameter approximately that of twice the diameter of one of the upper parts, namely, the part 15 of the twisted shank 12, or slightly smaller. Sized in this fashion, when the upper parts 15 and 19 are jammed into the bore 37, the upper ends will frictionally grip each other and also grip the wall of the bore 37 sufficient to hold the brushes in the handle.

What is of particular moment is the fact that although the upper parts 15 and 19 of the twisted wire shanks are firmly anchored in the bore of the tubular insert, the tubular insert is free to rotate and swivel within the cylindrical interior wall of the tubular casing where it is firmly secured by the bolt 31 already referred to.

In use, when the device is to be employed to clean a utensil or vessel, such as a drinking glass 38, the twin brushes 10 and 11 are slipped over outside and inside surfaces of the wall and the handle 20 gripped manually and moved so that the brushes simultaneously clean both the outside and the inside surfaces. Only a single grip need be taken of the handle because, despite any number of rotations around the circumference of the glass, the twin brushes will swivel in the handle and hence the grip need at no time be released.

The article may also be used in a conventional way as, for example, for cleaning the inside or outside of a pan 38, as illustrated in FIGURE 5. Even though in this instance both twin brushes 10 and 11 are applied to an inside surface 40 of a wall 41, the swivel action in the handle is of material assistance as the implement is turned around innumerable times against the inside surface sufficient to entirely clean it. This manipulation, as in the instance of the glass cleaning operation, employs the swivel action of the handle.

In a modified form of the invention illustrated in FIGURES 6 and 7 a handle 45 is provided with an outside brush 46 and an inside brush 47. In this instance, however, the brushes are not twins in that they are shaped differently for different cleaning purposes. For example, the outside brush 46 has a relatively short, stiff back 48 long enough to reach over most of the outside surface 49 of a wall 50 of a pot 51. The inside brush 47 has a back 52 appreciably longer than the back 48, namely, long enough to extend over the entire inside surface 53 of the wall 50 and a portion of an inside surface 54 of the bottom 55. A leg 56, forming part of the back 52, accommodates bristles 57 which brush against the surface 54. Further still, an outside angular portion 58 possesses additional bristles 59 which are bunched and directed so as to reach into an inside corner 60 at the junction of the bottom 55 with the side wall 50.

Further still, in the interest of providing a firm, durable structure, the back 48 and the back 52 may in fact consist of a single length of strap metal having a bend 61. A section 62 of the back 48 is reduced in breadth as is also a section 63 of the back 52. This is to permit the sections 62 and 63 to be jammed into a bore 64 within a tubular insert 65 which is swivelly mounted within the handle 45 in the same fashion as was described in connection with FIGURE 1 and there held by an appropriate bolt 66.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What is claimed is:

1. A hand-operated cleaning device for a food container having a perimetral wall extending around a bottom thereof, said device comprising a tubular handle having a cylindrical interior wall, an upper end and an open end, a tubular insert nesting within the handle and rotatably secured thereto, said insert having a cylindrical exterior surface in rotatable engagement with said interior wall, said tubular insert having an inside end in swivel engagement with said upper end and having an opening at the end opposite thereto, a brush member comprising a pair of relatively stiff elements having brush holding ends in parallel spaced relationship and having retention ends extending into said insert through said opening and in anchored relationship with said insert, and a mass of bristles on each of said brush holding ends, certain of said bristles on each of said holding ends extending inwardly and generally towards each other more than half the distance between said holding ends but less than the full distance between said ends whereby said bristles on respectively opposite ends overlap each other therebetween, whereby said tubular insert is adapted to rotate within said tubular handle when said brush ends are passed around the interior and exterior sides of said perimetral wall.

2. A hand-operated cleaning device for a food container having a perimetral wall extending around a bottom thereof, said device comprising a tubular handle having a length longer than the breadth of a human hand and having a cylindrical interior wall, a tubular insert nesting within the handle and rotatable secured thereto, said insert having a cylindrical exterior surface in rotatable engagement with said interior wall, said tubular handle having a closed end and an open end, said tubular insert having a closed end in swivel engagement with said first identified closed end and having an opening at the end opposite thereto, a brush member comprising a pair of relatively stiff elements having brush holding ends in parallel spaced relationship and having retention ends extending into said insert through said opening and in engagement with each other throughout substantially the entire length of the interior of said tubular insert and anchored relationship with said insert, and a mass of bristles on each of said brush holding ends, certain of said bristles on each of said holding ends extending inwardly and generally towards each other more than half the distance between said holding ends but less than the full distance between said ends whereby said bristles on respectively opposite ends overlap each other therebetween whereby said tubular insert is adapted to rotate within said tubular handle when said brush ends are passed around the interior and exterior sides of said perimetral wall, one of said brush ends having a terminal section in angularly bent relationship to the remainder thereof whereby the bristles thereof engage the inside of the bottom of said container while said brush ends are passed around said perimetral wall.

3. A hand-operated cleaning device for a food container having a perimetral wall extending around a bottom thereof, said device comprising a tubular handle having a cylindrical interior wall, a closed end and an open end, a tubular insert resting within the handle and rotatably secured thereto, said insert having a cylindrical exterior surface in rotatable engagement with said interior wall, said tubular insert having a closed end in swivel engagement with said first identified closed end and having an opening at the end opposite thereto, a brush member comprising a pair of relatively stiff elements having brush holding ends in parallel spaced relationship and retention ends extending into said insert through said opening and in engagement with each other and in anchored relationship with said insert, and a mass of bristles on each of said brush holding ends, certain of said bristles on each of said holding ends extending inwardly and generally towards each other more than half the distance between said ends whereby said bristles on respectively opposite ends overlap each other therebetween, whereby said tubular insert is adapted to rotate within said tubular handle when said brush ends are passed around the interior and exterior sides of said perimetral wall.

4. A hand-operated cleaning device for a food container having a perimetral wall extending around a bottom thereof, said device comprising a tubular handle having a length longer than the breadth of a human hand and having a cylindrical interior wall, a closed end and an open end, a tubular insert resting within the handle and rotatably secured thereto, said insert having a cylindrical exterior surface in rotatable engagement with said interior wall, said tubular insert having a closed end in swivel engagement with said first identified closed end and having an opening at the end opposite thereto, a brush member comprising a pair of relatively stiff elements having brush holding ends in parallel spaced relationship and retention ends extending into said insert through said opening and in engagement with each other throughout substantially the entire length of the interior of said tubular insert and in anchored relationship with said insert, and a mass of bristles on each of said brush holding ends, certain of said bristles on each of said holding ends extending inwardly and generally towards each other more than half of the distance between said holding ends but less than the full distance between said ends whereby said bristles on respectively opposite ends overlap each other therebetween, whereby said tubular insert is adapted to rotate within said tubular handle when said brush ends are passed around the interior and exterior sides of said perimetral wall, one of said brush ends having a terminal section in angularly bent relationship to the remainder thereof whereby the bristles thereof engage the inside of the bottom of said container while said brush ends are passed around said perimetral wall.

No references cited.

DANIEL BLUM, *Primary Examiner.*

CHARLES A. WILLMUTH, *Examiner.*